Figure 1:
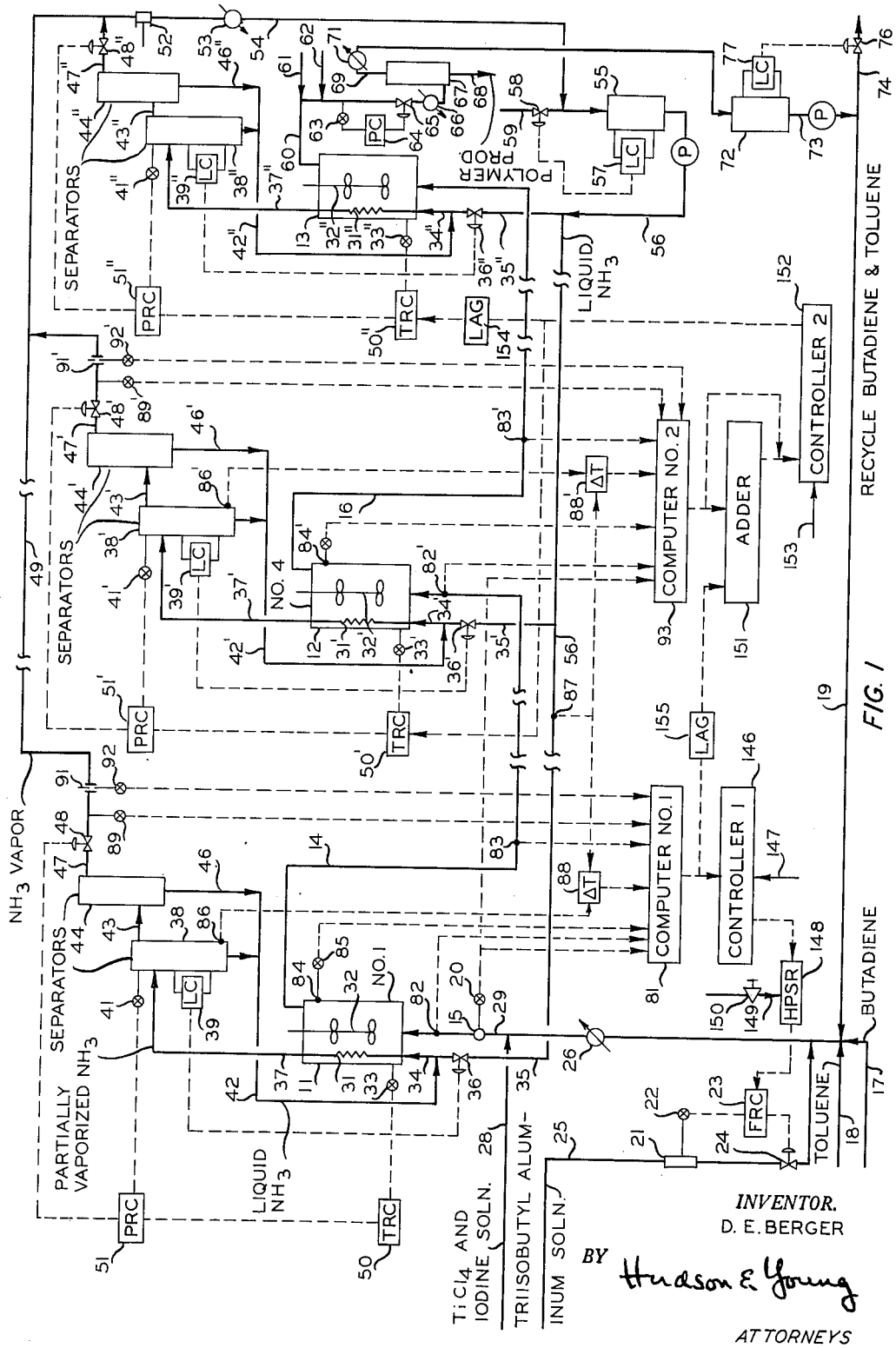

United States Patent Office 3,220,998
Patented Nov. 30, 1965

3,220,998
CONTROL OF EXOTHERMIC PROCESS CARRIED
OUT IN SERIES OF REACTORS
Donald E. Berger, Bartlesville, Okla., assignor to Phillips
Petroleum Company, a corporation of Delaware
Filed May 4, 1961, Ser. No. 120,814
4 Claims. (Cl. 260—94.3)

This invention relates to the control of an exothermic process carried out in a series of reactors. In another aspect, it relates to a method and apparatus for monitoring and/or controlling the production rate of the reaction product and the properties thereof in a continuous exothermic process carried out in the liquid phase in a plurality of reactors operated in a series. In a further aspect, it relates to a method and apparatus for controlling the production rate of a rubbery polymer, such as cis-1,4-polybutadiene, in a continuous exothermic catalytic polymerization process carried out in the liquid phase in a plurality of reactors operated in a series wherein the polymerizable monomer(s), such as butadiene, is only partially converted to said polymer.

There is a continuing effort in the chemical and allied industries to develop and exercise more effective and accurate control in various processes of the production rates of reaction products and the properties thereof. This is particularly true of the continuous exothermic process carried out in the liquid phase in a plurality of reactors operated in a series. It is this type of process that is the concern of this invention. In such a process, incremental or distinct conversions of reactant or feed to product occurs in each of the reactors as the reaction mixture is passed seriatim from one reactor to another. Usually only a portion of the reactant in such a process undergoes chemical reaction, that is, the total conversion of reactant to end product is less than 100 percent. For efficient operation of such a reactor train and in order to produce a product having uniform properties and a minimum of off-specification product, it becomes necessary to monitor and/or control the individual production rates in each of the several reactors and the nature of the cumulative production rate as the reaction progresses through the reactor train.

Many of the procedures and means proposed, patented, or used heretofore have not been found as satisfactory as desired in ensuring efficient and accurate control over the conversions carried out in the several reactors and in ensuring a product having uniform properties, such prior art procedures or means not lending themselves to efficient, dependable, and accurate feedback and/or feedforward control. For example, in the case of the catalytic polymerization of butadiene to produce cis-1,4-polybutadiene, wherein the exothermic polymerization reaction is carried out in a series of reactors, there is need for an effective procedure and means having control features for computing the rate of production of polymer product as the reaction material proceeds through the several reactors, so as to be able to reliably manipulate or control various input variables to ensure a high and constant production rate and production of a polymer product having uniform properties such as Mooney viscosity, molecular weight, stereospecificity, etc.

Figure 2:
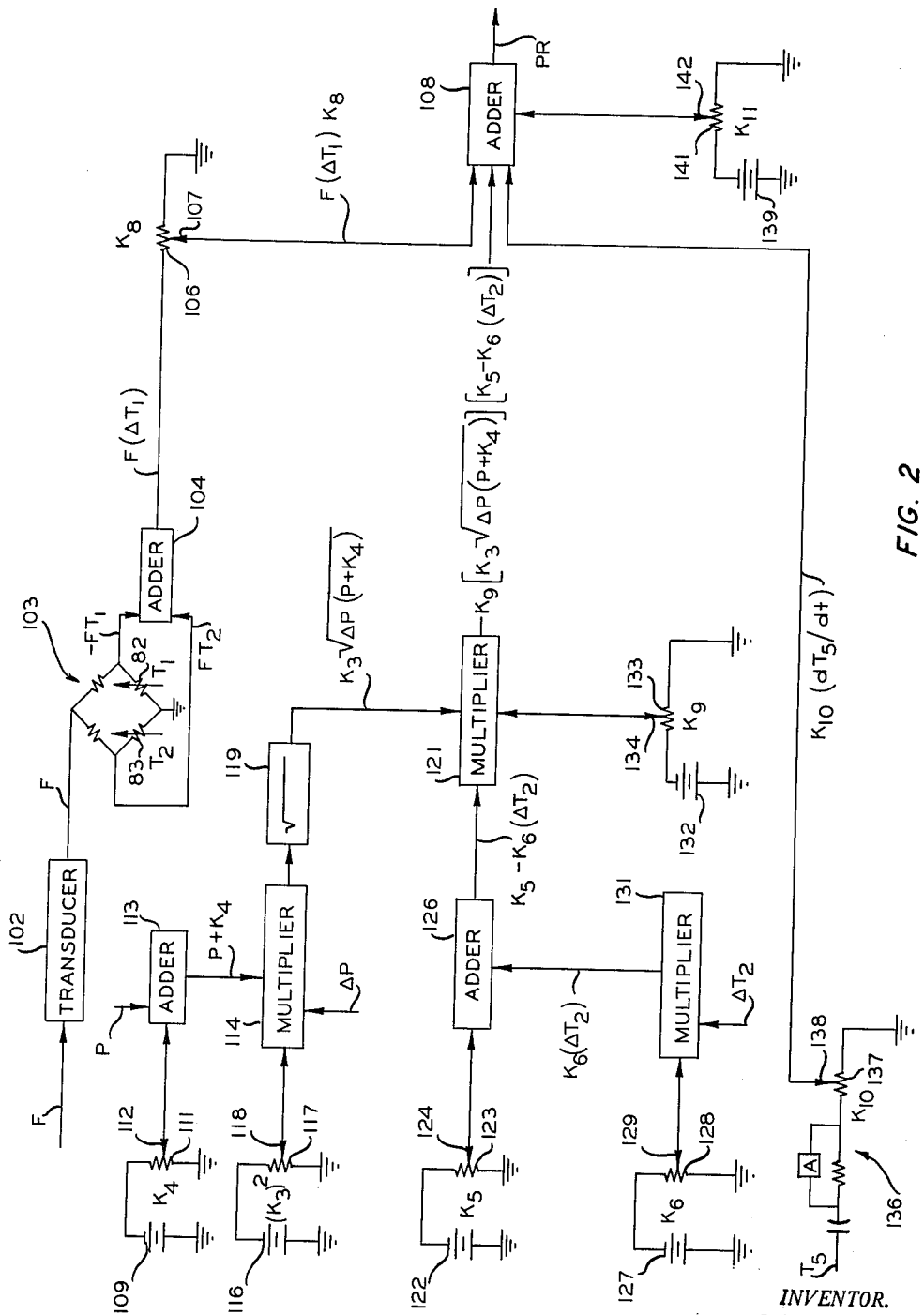

Accordingly, it is an object of this invention to control an exothermic process carried out in a series of reactors. Another object is to provide an improved method and apparatus for monitoring and/or controlling the production rate of reaction product and the properties thereof in an exothermic process carried out in the liquid phase in a plurality of reactors operated in a series. Another object is to provide an improved method and apparatus for controlling the production rate of a rubbery polymer, such as cis-1,4-polybutadiene, and the properties thereof, in a continuous exothermic catalytic polymerization process carried out in the liquid phase in a plurality of reactors operated in a series wherein the polymerizable monomer(s), such as butadiene, is only partially converted to said polymer. Another object is to maintain a constant production rate of reaction product at full plant capacity in an exothermic process carried out in a series of reactors. Another object is to ensure production of a product with uniform and desirable properties and a minimum of off-specification product in an exothermic process carried out in a series of reactors. Further objects and advantages of this invention will become apparent to those skilled in the art from the following discussion, appended claims, and accompanying drawing wherein:

FIGURE 1 illustrates a schematic flow diagram of a typical process controlled in accordance with this invention, namely the catalytic polymerization of butadiene to produce cis-1,4-polybutadiene, with the novel features of this invention associated therewith; and FIGURE 2 illustrates a schematic circuit diagram of elements or components of an electronic analog computer which can be employed in the control system illustrated in FIGURE 1.

Although this invention finds particular utility in conjunction with polymerization processes wherein only a portion of the reactant feed is converted to end product such as the catalytic polymerization of olefins (e.g., butadiene to cis-1,4-polybutadiene)—and this invention will be described hereinafter in detail as applied to such a process—it is not to be unduly limited thereto, since it finds application in any process in which a continuous exothermic reaction is carried out in the liquid phase in a plurality of reactors operated in a series, including other polymerization processes, e.g., the copolymerization of butadiene and styrene, and such other processes as alkylation, hydrogenation, isomerization, etc.

In one of its broader aspects, this invention provides an improved procedure and means for determining the production rate of reaction product in at least the first of the first two reactors in a plurality of reactors operated in a series in a continuous exothermic process by automatically computing a heat balance around at least the first of said first two reactors from input data, and accordingly automatically controlling at least the first of said first two reactors by manipulating one or more of the input variables, such as feed rate, catalyst rate, temperature, pressure, etc., to hold said production rate constant.

In another of its broader aspects, this invention provides an improved procedure and means for determining the production rate of reaction product in at least one of the downstream reactors in a plurality of reactors operated in a series in an exothermic process by automatically computing a heat balance around at least one of said downstream reactors from input data, and accordingly automatically controlling said downstream reactor(s) by manipulating one of the input variables to hold said production rate constant. In many cases, by determining the production rate in one of the intermediate reactors, say the 4th reactor in a series of 9 reactors, this will be sufficient to indicate the general level or trend of production rate in all of the reactors downstream thereof. So, the temperatures in the intermediate and downstream reactors can be manipulated in response to the computed production rate of the intermediate reactor.

In another of its broader aspects, this invention provides an improved procedure and means for determining a first production rate of reaction product in at least the first of the first two reactors of a plurality of reactors operated in a series in an exothermic process by automatically computing a heat balance around at least the first of the first two reactors, determining a second production rate of reaction product in at least one of the downstream reactors by computing a heat balance around at least one of said downstream reactors, and accordingly using the computed first production rate to manipulate one of the input variables of said first reactor to hold said first production rate constant, and accordingly using the computed second production rate by itself or in combination with said first production rate to manipulate one of the input variables of said downstream reactor and thereby hold said second production rate constant.

In all of these embodiments, the subject invention computes the heat generated by reaction in one or more of the reactors as an indication of the production rate in one of the individual reactors, or in a combination of reactors, or in the entire reactor train, using such information in the control of input variables to ensure a constant rate of production and the production of a product of uniform properties.

In a preferred embodiment of this invention, as applied to the catalytic polymerization of butadiene to cis-1,4-polybutadiene in a plurality of reactors operated in a series, the production rate of polymer in the first reactor is determined by automatically computing the heat generated by reaction in the first reactor and automatically manipulating the flow rate of total catalyst or a catalyst component to said first reactor, and automatically determining the production rate of polymer in one of the intermediate downstream reactors, e.g., the fourth reactor in a series of nine reactors, by automatically computing the heat generated by reaction in said downstream reactor and automatically manipulating the vaporization temperature of the volatile coolant in indirect heat exchange with the reaction mixture in said downstream reactors, thereby maintaining a constant production rate of polymer in the several reactors and the production of a cis-1,4-polybutadiene product and a minimum amount of off-specification product.

Reference will now be made to the accompanying drawing, and initially to FIGURE 1, where a process for the catalytic polymerization of butadiene to cis-1,4-polybutadiene is illustrated together with the novel features of this invention. This process per se is known in the art and reference is made to the prior art such as U.S. Patent 2,825,721 for a fuller description thereof.

In FIGURE 1, a series or train of polymerization reactors 11, 12 and 13 are shown connected in a series by conduits 14 and 16. Conduits 14 and 16 are shown as broken lines indicating that other reactors of a similar type can be included in the reactor train. The number of reactors employed depends upon the optimum size of the reactors, desired residence time, and design capacity of the polymerization plant. It is frequently desirable to employ about seven to eleven reactors, preferably nine, in a series with three or four other reactors available for use in the event that one or more of the on-stream reactors needs to be taken out of service. These reactors are operated liquid-full, the over-all flow rate through the train being held constant and the withdrawal of effluent at the end of the train being governed by the pressure in the train.

Makeup butadiene monomer for the process is supplied by conduit 17 and makeup toluene solvent for the reaction is added to conduit 17 through conduit 18. A recycle stream of solvent and unreacted monomer is also introduced to conduit 17 through conduit 19. These reactant and solvent containing streams are supplied at constant volume and constant composition. Triisobutylaluminum catalyst component, which acts to maintain the activity of the polymerization catalyst by reducing the valence level of a titanium catalyst component and by scavenging catalyst poisons in the reactant and solvent streams, can be added as a solution in toluene to conduit 17 through conduit 25. The rate of flow of the solution of triisobutylaluminum catalyst component in line 25 can be measured, controlled, and manipulated by means of a rotameter 21, flow rate transmitter 22, flow rate controller 23, and flow control valve 24, the rate of flow being maintained substantially constant by a set point established for flow rate controller 23. The resulting mixture of butadiene, toluene, and triisobutylaluminum is cooled in cooler 26 and passed via conduit 29 into reactor 11. Titanium tetrachloride polymerization catalyst in a toluene solution containing dissolved elemental iodine is introduced into conduit 29 via conduit 28, the titanium tetrachloride component and iodine component being freshly admixed in toluene just prior to admixture with the other reactor feed components. The resulting precooled feed mixture containing the formed catalyst complex is then supplied through conduit 29 to the first reactor 11 at a constant volume and constant composition.

The total flow of feed in line 29 is sensed by a turbine flow element 15 which with frequency converter 20 produces a signal representative of the mass (gravimetric) rate of flow of feed. The individual feed components, with the exception of the triisobutylaluminum component, bear fixed ratios one to another.

The polymerization reaction proceeds as the reaction mixture is passed successively through each of the reactors in the train, the butadiene monomer being incrementally converted to polymer in each of the reactors. Each of the latter, including the intermediate reactors not shown, are equipped with suitable heat exchange means such as cooling coils 31 and/or jackets (not shown), agitation means such as stirrers 32, and conventional reaction temperature measuring and transmitting means 33. Coolant such as liquid ammonia is supplied to each of cooling coils 31 through conduits 34, 35, each of conduits 35 having a flow control valve 36 therein. The coolant cools the reaction materials by vaporizing within coils 31, the temperature of vaporization being determined by the pressure within the coils. The partially vaporized coolant is withdrawn from each of the cooling coils 31 and passed via conduit 37 to a primary liquid-vapor separator 38 provided with a liquid level controller 39 and a pressure sensing and transmitting means 41. Liquid ammonia is drained from each of the primary separators 38 and passed via line 42 to the coolant supply lines 34. Coolant vapor is removed from each of primary separators 38 via conduit 43 and supplied to a secondary liquid-vapor separator 44, separated liquid coolant being withdrawn therefrom via conduit 46 and returned via lines 42 and 34 to cooling coils 31. The uncondensed coolant vapor is withdrawn via conduit 47 from the secondary separators 44, this rate of withdrawal being controlled by flow control valve 48, in accordance with the pressure as measured by means 41, and the set point applied to controller 51, so that the pressure (and consequently the temperature) at which the liquid coolant vaporizes in the cooling coils 31 is controlled. The coolant vapors withdrawn from the secondary separators 44 are passed to a common coolant vapor header 49, the combined coolant vapor streams are compressed by compressor 52, condensed in condenser 53, and passed via line 54 to a surge tank 55. Liquid coolant is withdrawn from surge tank 55 via conduit 56 and pumped to the coolant supply lines 35. Surge tank 55 is provided with a liquid level controller 57 which governs a flow control valve 58 in a makeup liquid coolant supply line 59.

The temperature of the reaction mixtures in each of the reactors is sensed by temperature measuring and transmitting means 33, the latter transmitting a signal to a temperature recorder controller 50. Temperature recorder controller 50 transmits a signal to pressure recorder controller 51 manipulating the set point thereof, the pressure recorder controller 51 in turn manipulating flow rate control valve 48, so that the temperature of reaction mixtures within the various reactors can be adjusted and controlled at substantially constant values by controlling the pressures of the coolant within cooling coils 31.

If desired, further amounts of polymerization catalyst, monomer, and solvent can be occasionally or periodically added to intermediate points in the reactor train to increase the efficiency of the polymerization reaction.

The reaction effluent from the last reactor 13 is withdrawn via line 60 and it is frequently desirable at this point to inject one or more additives to aid in the control of the polymerization and/or to improve the polymer product. For example, it is desirable that the polymerization cease after the effluent is withdrawn from the last reactor, and for this purpose a shortstop or catalyst inactivating agent, such as rosin acid, can be added to the effluent stream via conduit 61. Another additive frequently injected at this point is an anti-oxidant which can be added to the effluent stream via conduit 62. The flow rates of these additives can be regulated and maintained substantially constant.

The rate of withdrawal of effluent from the reactor train can be regulated by means of pressure measuring and transmitting means 63, pressure recorder controller 64, and flow rate control valve 65. The polymerization effluent is then passed through a series of alternate heaters and flash chambers, although for sake of brevity I have illustrated in FIGURE 1 only one heater 66 and one flash chamber 67. The heated effluent is passed into each of the flash chambers and its pressure reduced, thereby causing unreacted monomer and a substantial amount of solvent to vaporize or flash overhead. Polymer product and unvaporized material is removed from the flash chamber 67 via line 68 and passed to suitable finishing equipment. The vapors in overhead line 69 from flash chamber 67 are cooled and condensed in heat exchanger 71 and the condensate is passed to a surge tank 72. A liquid stream of solvent and unreacted monomer of substantially constant composition is removed from surge tank 72 via line 73 and this stream is divided, a substantially constant volume portion being recycled via conduit 19 and the remainder passed through conduit 74 to suitable purification equipment. Conduit 74 is provided with a flow control valve 76 which is manipulated by a liquid level controller 77 on surge tank 72.

The representative process just described does not by itself constitute the subject invention. What I have discovered is that the production rate in at least one of the reactors in the reactor train can be determined by automatically solving a heat balance equation around such a reactor from the input data of various process variables. In such a heat balance, the difference between the heat removed from the reactor (including the depletion of heat in the reactor due to changes in reactor temperature) and the heat supplied to the reactor (including the accumulation of heat in the reactor due to changes in reactor temperature) will be equal to the heat generated by reaction in the reactor. The heat generated is directly proportional to the mass of reactant feed being converted to product per unit of time. Since not all of the reactant feed is reacted, the fraction of monomer that reacts is generally called percent conversion. Therefore, percent conversion or degree of conversion is the ratio of the rate of reactant reacted to the feed rate of reactant. In the case where the rate of reactant feed is maintained substantially constant, percent conversion is directly proportional to production rate of product and may be considered synonomous.

The heat balance computation takes into consideration: the sensible heat of the reactant feed stream; the heat added to the reactor by agitation—which can be continuously measured or assumed to be a constant; the heat transferred into the reactor from its surroundings, e.g., heat gain through the reactor insulation—which can also be continuously measured or assumed to be a constant; the heat carried out of the reactor by vaporization of coolant in the cooling coils; and a dynamic correction factor for the accumulation or depletion of heat (negative accumulation of heat) in the reactor resulting from changes in reactor temperature. The heat evolved in B.t.u./hr. can be found by summing these various heat quantities. Dividing this heat quantity by a constant equal to the heat of reaction (B.t.u./lb.) for the particular reaction, the production rate, PR, in lbs./hr. can be found.

The production rate can be expressed by the following equation:

$$PR = \frac{Q_1 + Q_2 + Q_3 - Q_4 - Q_5}{K_1} \quad (1)$$

where $PR$ = production rate of product in reactor (lbs./hr.)
$Q_1$ = sensible heat removed by feed in reactor (B.t.u./hr.)
$Q_2$ = heat removed from reactor by coolant (B.t.u./hr.)
$Q_3$ = dynamic thermal correction for change in temperature in reactor (B.t.u./hr.)
$Q_4$ = heat added to reactor by mixing (B.t.u./hr.)
$Q_5$ = heat transferred to reactor from surroundings (B.t.u./hr.)
$K_1$ = heat of reaction for particular reaction (B.t.u./lb.)

Equations for $Q_1$ through $Q_3$ are as follows:

$$Q_1 = F_A \Delta T_1) K_2 \quad (2)$$
$$Q_2 = [K_3 \sqrt{\Delta P(P + K_4)}][K_5 - K_6(\Delta T_2)] \quad (3)$$
$$Q_3 = K_7(dT_5/dt) \quad (4)$$

where $F$ = flow rate of feed to reactor (lbs./hr.)
$\Delta T_1 = (T_2 - T_1)$ = difference in temperature between temperature $T_2$ of reactor effluent and temperature $T_1$ of feed to reactor (°F.).
$K_2$ = specific heat of feed to reactor (B.t.u./lb./° F.)
$K_3$ = an orifice constant for an orifice in coolant vapor line
$\Delta P$ = differential pressure across orifice plate in coolant vapor line (inches of water)
$P$ = pressure of vaporized coolant upstream of orifice plate (p.s.i.g.)
$K_4$ = atmospheric pressure (p.s.i.g.)
$K_5$ = heat of vaporization of coolant vapors (B.t.u./lb.)
$K_6$ = average specific heat of liquid coolant (B.t.u./lb.)
$\Delta T_2 = (T_3 - T_4)$ = difference in temperature between temperature $T_3$ of makeup liquid coolant before pressure reduction, and temperature $T_4$ of liquid coolant from surge tank (° F.)
$K_7$ = heat capacity of reactor vessel and process fluid in reactor
$dT_5/dt$ = rate of change of temperature $T_5$ in reactor with respect to time (°F./hr.)

Dividing each of Equations 2, 3, and 4 by said $K_1$, assuming $Q_4$ and $Q_5$ are constants and dividing each by $K_1$, and substituting Equations 2, 3, and 4 in Equation 1, the latter can be expressed as:

$$PR = F(\Delta T_1)K_8 + K_9[K_3\sqrt{\Delta P(P + K_4)}]$$
$$[K_5 - K_6(\Delta T_2)] + K_{10}(dT_5/dt) - K_{11} \quad (5)$$

where $K_8 = K_2/K_1$
$K_9 = 1/K_1$
$K_{10} = K_7/K_1$
$K_{11} = Q_4/K_1 + Q_5/K_1$ Where the combined production rate for a number $n$ of reactors is determined according to our invention, a heat balance is performed around each of the reactors under consideration and the computed production rates for each reactor are added. Thus:

$$PR_c = PR_1 + PR_2 + \ldots PR_n \quad (6)$$

where $PR_c$ = combined production rate
$PR_1$ = production rate of one reactor $PR_2$=production rate of another reactor
$PR_n$=production rate of $n$th reactor As mentioned above, the heat added to the reactor by the heat of mixing can be either continuously measured or assumed to be a constant. For example, in the representative process shown in the drawing, the heat generated by mixing can be assumed to be a constant equal to 40,000 B.t.u./hr. This heat of mixing can be determined by measuring the difference between the power required by the stirrer motor unloaded (reactor empty) and the power required during normal reactor operation, using for this purpose a wattmeter which can be a thermal converter of the type described in Bulletin 77–39–0–2 of the Leeds & Northrup Co., Philadelphia, Pa. For example $Q_4$ can be found by the equation:

$$Q_4 = (KW_{load} - KW_{no\ load}) \times 3{,}413 \qquad (7)$$

where $KW_{load}$=energy supplied to motor with a load on the stirrer (reactor full)
$KW_{no\ load}$=energy supplied to motor without a load on the stirrer (reactor empty)
3,143=B.t.u. per kw. hour (thermal equivalent of electrical energy)

The heat transferred to the reactor from the surroundings also can be assumed to be a constant, e.g., 10,000 B.t.u./hr. for the representative process shown in the drawing, or measured by heat flow discs maintained in several locations around the reactor. For example, copper versus silver telluride differential thermocouples are maintained on opposite sides of a disc of known area, thickness and thermal conductivity and a signal is generated proportional to the heat flow through the disc. This heat loss $Q_5$ can be represented by the equation:

$$Q_5 = KV \qquad (8)$$

where $K$=a constant, derived from the thermal conductivity of the disc and the ratio of reactor surface area to disc area
$V$=temperature difference across heat flow disc Reference will now be made again to FIGURE 1 where the representative process is shown associated with the various means to measure the process variables used in computing production rate according to this invention.

In FIGURE 1, a heat balance computer 81 (hereinafter referred to as heat balance computer No. 1) is shown supplied with a number of input signals from process variables associated with the first reactor 11 in the reactor train. This heat balance computer No. 1 is designed to determine the production rate in the first reactor by computing a heat balance around said reactor from said input data. Flow transmitter 20 supplied a signal, F in Equation 5, proportional to the rate of flow of reactor feed in line 29 in lbs./hr.; for example, this signal can be an 0.2–10 volts D.C. signal linearly proportional to 0 to 240,000 lbs./hr. of process fluid flow. The temperature of the reactor feed in line 29 is measured by a suitable resistance thermometer element 82 or the like, such as a Minneapolis Honeywell high resistance bulb unit, Type 922 C1 having a resistance of 491.8 ohms at 20° F. and a temperature coefficient of approximately 1.3 ohms per degree F. Similarly, a resistance thermometer element 83 measures the temperature of the reactor effluent in line 14 (which reactor effluent serves as the feed for the second reactor in the train). These temperatures are transmitted as signals to heat balance computer No. 1 where, as will be subsequently described, these signals are supplied to a differential temperature bridge to measure $\Delta T_1$ of Equation 5. The temperature in the reactor 11 is sensed by a highly sensitive temperature element or thermistor 84 and transmitted by transmitter 85 to heat balance computer No. 1 where the temperature, $T_5$, is differentiated to provide a signal proportional to $dT_5/dt$ of Equation 5. A temperature sensing element or thermocouple 86 senses the temperature of the liquid coolant in separator 38 and a similar temperature sensing element or thermocouple 87 in the liquid coolant supply header 56 senses the temperature of the liquid coolant, these two temperatures signals being supplied to a suitable temperature difference unit 88, which produces an accompanying signal proportional to the $\Delta T_2$ of Equation 5, which signal is transmitted to heat balance computer No. 1. The overhead line 47 of separator 44, containing the vaporized coolant, is provided with a pressure sensing and transmitting element 89, which transmits a signal proportional to the pressure, P in Equation 5, of the vaporized coolant to the heat balance computer No. 1. The differential pressure across an orifice plate 91 in the vaporized coolant line 47 is measured and transmitted by transmitter 92 to heat balance computer No. 1, this signal being proportional to $\Delta P$ of Equation 5.

FIGURE 1 also shows a second heat balance computer 93 (hereinafter referred to as heat balance computer No. 2) which is designed to compute the heat balance around one of the downstream reactors, e.g., the fourth reactor in a reactor train containing nine reactors, this computer being supplied with input signals associated with this reactor. These latter input signals are derived in the same manner as those described above with reference to the first reactor. Since the mass rate of flow of feed to the first reactor will be exactly the same as that fed to reactor 12, the signal from flow transmitter 20 can also be transmitted to heat balance computer No. 2. Also, the signal from thermocouple 87 can also be supplied to the temperature difference unit 88' associated with reactor 12. In other respects, the various process variables of reactor 12 are detected and signals proportional thereto generated in a manner like that described for reactor 11, and these in the interest of brevity will not be described. It is of course within the scope of this invention to compute the heat balance around any of the other reactors in the reactor train in the manner described for reactors 11 and 12.

The production rate for each of the reactors can be computed by the heat balance computers by means of electronic, pneumatic, or mechanical analogy, separately and in combination, since all of the components needed to perform the computation are individually well known in the art. Reference will be now be made to the schematic electronic circuitry shown in FIGURE 2, which illustrates one embodiment of a computer which can be used in the practice of this invention. It is the combination of the components of FIGURE 2 into a specific cooperation which permits the automatic and continuous computation of production rate suitable for use in process control which constitutes this aspect of my invention.

In FIGURE 2, a signal F proportional to the rate of flow of reactor feed in line 29 is transmitted by flow transmitter 20 to transducer 102. This signal F will be in volts and it is necessary to convert the same into a current signal; for this reason, the signal F is passed to voltage-to-current transducer 102, which produces a current output proportional to F. This current signal F is impressed across a differential temperature bridge 103 having a resistance thermometer bulb 82 in one arm and a resistance thermometer bulb 83 in the other arm, these resistance elements respectively sensing the temperatures in the reactor feed line 29 and reactor effluent line 14. Said current signal F is multiplied by resistance 82 and also by resistance 83 and the resulting products $FT_2$ and $-FT_1$ are transmitted as inputs potentials to adder 104 where they are added. The output signal $F(\Delta T_1)$ from adder 104 is applied across a potentiometer 106. The contactor 107 of potentiometer 106 is positioned such as to multiply signal $F(\Delta T_1)$ by the constant $K_8$ of Equation 5. Thus a signal $F(\Delta T_1)K_8$ is produced and it is supplied to adder 108, this signal being proportional to the first addend of Equation 5.

A reference potential from source 109 is applied across a potentiometer 111, the contactor 112 of which is positioned so as to send a signal to an adder 113 proportional to the constant $K_4$ of Equation 5. A signal P proportional to the pressure of the vaporized coolant in line 47 upstream of orifice plate 91 is transmitted by the transmitter 89 of FIGURE 1 to adder 113, this signal P being proportional to the P of Equation 5. Adder 113 adds signals P and K4 and the sum is transmitted as a signal to multiplier 114. A reference potential from source 116 is applied across a potentiometer 117, the contactor 118 of which is positioned so as to apply a signal to multiplier 114 proportional to the square of the constant $K_3$ of Equation 3. Another signal $\Delta P$, proportional to the differential pressure across orifice plate 91 in the coolant vapor line 47, is transmitted by the transmitter 92 of FIGURE 1 to multiplier 114. Thus, multiplier 114 multiplies the signals $(P+K_4)$, $\Delta P$ and $(K_3)^2$, and this product is supplied to a square root extractor 119 which produces a signal $K_3\sqrt{\Delta P(P+K_4)}$. This signal is applied to a multiplier 121.

A reference potential from source 122 is applied across a potentiometer 123, the contactor 124 of which is positioned to transmit a signal to adder 126 proportional to the constant $K_5$ of Equation 5. Another reference potential from a source 127 is applied to a potentiometer 128, the contactor 129 of which is positioned to apply to a multiplier 131 a signal proportional to the constant $K_6$ of Equation 5. A signal $\Delta T_2$ is transmitted from the differential temperature means 88 of FIGURE 1 and applied to multiplier 131, this signal being proportional to the $\Delta T_2$ in Equation 5. The product $K_6(\Delta T_2)$ from multiplier 131 is transmitted to adder 126, and a signal proportional to $K_5-K_6(\Delta T_2)$ is applied to multiplier 121. A reference potential from a source 132 is applied across a potentiometer 133, the contactor 134 of which is positioned so as to supply multiplier 131 with a signal proportional to the constant $K_9$ of Equation 5. The multiplier 121 multiplies the various signals transmitted thereto and the product $K_9[K_3\sqrt{\Delta P(P+K_4)}][K_5-K_6(\Delta T_2)]$ proportional to the second addend of Equation 5 is transmitted as a signal to adder 108.

A signal proportional to the reactor temperature is transmitted from the transmitter 85 of FIGURE 1 to a differentiating network 136 comprising a condenser, resistance, and operational amplifier. This network differentiates $T_5$ with respect to time and applies a potential proportional to the $dT_5/dt$ of Equation 5 to a potentiometer 137, the contactor 138 of which is positioned to multiply $dT_5/dt$ by the constant $K_{10}$ of Equation 5. The resulting product $K_{10}(dT_5/dt)$ proportional to the third addend of Equation 5 is transmitted as a signal to adder 108. A reference potential from source 139 is applied across a potentiometer 141, the contactor 142 of which is positioned to supply adder 108 with a signal proportional to the constant $K_{11}$ of Equation 5.

In adder 108, the various signals are added and an output signal PR is produced which is linearly proportional to the product production rate in lbs./hr.; for example, a 4 to 20 ma. D.C. current signal operating over a full scale range of 0 to 3,000 lbs./hr. with a normal operating range of 293 to 2,930 lbs./hr.

I have just described a preferred embodiment of the computer No. 1 designated as 81 in FIGURE 1. It is understood of course that the computer No. 2 designated 93 in FIGURE 1 is just the same and designed to also produce an output signal proportional to the production rate in reactor 12. The output signals from computers No. 1 and No. 2 are used in the control of the process to ensure a high and constant production rate and the production of a product having uniform quality.

As mentioned earlier, the production rate is dependent upon catalyst activity which in turn is quite sensitive to catalyst poisons, such as water in the feed streams. For example, as trace poisons are unavoidably fed to the reaction system at an increased rate, thereby lowering the activity of the catalyst, the degree of conversion and the production rate will decline. According to this process control feature, as the computer No. 1 senses the decline in production rate, the rate of flow of triisobutyl aluminum catalyst in line 25 is manipulated so as to increase the amount of scavenging and reducing catalyst added to the reactor feed stream. This additional catalyst reacts with the additional impurities which are being fed to the system, thereby returning the catalyst activity to a desired level in order to obtain the desired percent conversion of monomer to polymer. This operation can be accomplished by transmitting the PR signal from computer No. 1 to a conventional electro-pneumatic controller 146, where the computed PR signal is compared with a desired PR signal supplied to controller 146 by set point 147. If the computed and desired PR signals differ, a signal related to this difference is accordingly transmitted to change the set point of flow rate controller 23. This signal can be transmitted by controller 146 directly to flow rate controller 23 but preferably this is done as shown in FIGURE 1 by transmitting the signal from controller 146 to a higher pressure selecting relay 148, such as manufactured by Taylor Instrument Co., Model SK11359. Relay 148 selects the higher of the two control set point signals, as shown by line 149 and by the output of controller 146, applying it as the set point of controller 23. This has the effect of establishing a minimum flow rate of triisobutyl aluminum component, which may be manually set, at the exact rate required for formation of the active catalyst complex with the titanium tetrachloride stream 28, or above or below this level as desired, by the proper adjustment of air pressure regulator 150 supplying signal 149 to said relay 148 as shown in FIGURE 1.

As mentioned before, the temperature of the reaction also affects conversion and production rate. Where the heat balance is computed around one or more downstream reactors, according to this invention, the thus computed PR or the combined PR values for several reactors are used in a second control system in which the temperature of reaction in these downstream reactors is manipulated so that the desired PR is obtained. For example, in FIGURE 1, the production rate from heat balance computer No. 2 can be passed to a controller 152 like that of controller 146, where the computed PR value is compared with a desired PR value supplied as a set point 153. A signal related to the difference in the computed and desired PR values in transmitted from controller 152 to the temperature recorder controllers 50' and 50" of the downstream reactors, changing the set points of these controllers to change the pressure at which the coolant is allowed to vaporize. This causes a change in the temperature of the coolant in the cooling coils, thus changing the polymerization temperature in reactors 12 and 13. For example, if the production rate in downstream reactor 12 is below that desired, the set point of the temperature recorder controller 50' associated with that reactor is manipulated so as to call for a higher temperature in reactor 12, such that the pressure recorder controller 51' is adjusted to control the opening of valve 48' and thereby the temperature at which coolant is vaporized in the cooling coil 31'. Where the signal from controller 152 is transmitted to a temperature recorder controller of a reactor downstream of that reactor around which the heat balance is computed, it usually will be desirable to delay this signal for a predetermined time. For example, the signal transmitted from controller 152 to temperature recorder controller 50" is first transmitted to signal lag means 154, such as a Nullmatic M/F Relay, Model 68V4, supplied by Moore Products Co. and described in Bulletin AD68, December 1955.

It is also within the scope of this invention to add the PR values computed for the first reactor in the train and at least one of the downstream reactors, and use the sum of these PR values in control of the downstream reactors.

For example, the output from computer No. 1, after passing through a similar signal lag 155, which relays the PR signal similarly to the delay applied to the actual process material by the intervening reactors, and the output from computer No. 2 are both transmitted to an adder 151, where the sum is computed and transmitted to controller 152. In controller 152, the signal proportional to the combined PR values is compared with a desired PR value transmitted to the controller 152 as a set point 153, and a signal related to the difference is transmitted to temperature recorder controllers 50' and 50" to change the set points thereof. This brings about the same changes in temperature of reactors 12 and 13 which in turn produces the desired total production rate represented by set point 153.

The coordination of the dynamic behavior of the heat balance computer-control system with the dynamic behavior of the polymerization system by lag 155 allows the incorporation of a form of predictive or anticipatory control. Where the summation of the lags produced by the intervening reactors is greater than the lag produced in the computed production rate from computer No. 1 by lag network 155, a disturbance in the production rate signal from reactor 11 reaches controller 152 in advance of the actual process disturbance reaching reactor 12. In this manner, reactors 12 and 13 anticipate this disturbance and partial adjustment of their operation takes place before the actual disturbance is encountered. The result of this preparation for the disturbance is to considerably reduce the magnitude and the duration of the deviation from desired production rate in reactor 12 caused by the disturbance, so that little if any deviation from the desired production rate at the end of the reactor train, line 60, is incurred.

While my invention can be applied broadly to the control of reactions wherein a component is only partially converted to the end product, it is of special importance in the control of polymerization reactions, for example, in the catalytic polymerization of olefins. One process which can controlled according to our invention is the catalytic polymerization of olefins to normally solid polymers as described in the U.S. Patent 2,825,721 to J. P. Hogan et al. The invention is especially useful in the catalytic polymerization of conjugated dienes containing from 4–8 carbon atoms to produce rubbery polymer. Examples of these conjugated dienes include 1,3-butadiene, isoprene, piperyline, 2-methyl-1,3-pentadiene, and the like. These monomers can be formed into homopolymers or copolymerized with each other or with other monomers containing a vinylidene group, such as aliphatic 1-olefins containing up to 8 carbon atoms per molecule, styrene, various alkyl styrenes and heterocyclic nitrogen containing monomers such as 2-methyl-5-vinylpyridine, and the like.

Catalyst systems which are preferably used in connection with the polymerization of the above-named conjugated dienes are those which contain as an essential component a compound selected from the group consisting of organo-metals or metal hydrides, the metals being of Groups I, II or III of the periodic table. I prefer to use catalyst systems which comprise (a) a hydride or organo compound of one of the metals aluminum, gallium, indium, thallium and beryllium and (b) a di-, tri-, or tetrahalide of a Group IV metal such as titanium, silicon, thorium, zirconium, tin, lead, hafnium, germanium or cerium. Among the catalyst compositions which I prefer are mixtures of titanium tetrachloride and triethylaluminum, a mixture of titanium tetrachloride and tripropylaluminum, a mixture of titanium tetrachloride and triisobutylaluminum, and a mixture of zirconium tetrachloride and triethylaluminum. A third component can be used if desired. For example, a catalyst containing triisobutylaluminum, titanium tetrachloride and iodine can be used to polymerize 1,3-butadiene to a polymer of high cis-content. Mixtures of triisobutylaluminum, titanium tetrachloride and titanium tetraiodide can also be used for this purpose.

In such catalyst systems the mol ratio of the organoaluminum compound to the titanium tetrachloride is generally in the range from 2:1 to 100:1. The catalyst level in the polymerization should be above about 1.0 gram millimoles of organoaluminum compound per 100 grams of 1,3-butadiene and ordinarily the catalyst level does not exceed about 20 gram millimoles of the organoaluminum compound per 100 grams of 1,3-butadiene.

The temperature of the polymerization should not exceed 300° F. and ordinarily it is within the range of about −60 to 120° F. In the formation of cis-1,4-polybutadiene a temperature of about 10 to 50° is preferred.

The reactions to which the features of my invention are applied are preferably carried out in the presence of a diluent or solvent. The polymerization reactions are ordinarily carried out in the presence of an inert hydrocarbon diluent and monomer and the pressure is sufficient to maintain this diluent in the liquid phase. Suitable diluents for these polymerization processes are the paraffins and cycloparaffins and/or aromatic hydrocarbons which are relatively inert, non-deleterious and liquid under the conditions of the process. Low molecular weight paraffins having 3–5 carbon atoms can be used when the process is carried out at low temperatures but the high molecular weight paraffins and cycloparaffins such as isooctane, cyclohexane and methyl cyclohexane, and aromatic diluents such as benzene, toluene, and the like, are preferred. The individual reactor residence time can vary widely, for example from a few minutes to 1 or more hours, for continuous reactions.

The degree of conversion of monomer to polymer depends on the activity of catalyst and upon the temperature of reaction. As stated previously, a preferred operating temperature for the polymerization of 1,3-butadiene is in the range of about 10 to 50° F. Ordinarily the conversion is approximately 60 percent in such a reaction and when a series of reactors are employed, as shown in FIGURE 1, most of the conversion takes place in the first two or three reactors. For this reason it is desirable to maintain the temperature of the first reactors in the train somewhat below the average temperature maintained in the downstream reactors. In this manner a better balance of the heat removal load is obtained and it is easier to keep the polymerization reaction under control.

As the polymerization effluent leaves the last reactor in the series a non-volatile catalyst inactivating agent having active hydrogen groups is added in order to stop the polymerization. By "non-volatile" I refer to the relative volatility of the agent under the conditions employed to separate the unreacted monomer and diluent from the reaction effluent. These materials are recovered and recycled directly to the reaction so that it is important that the catalyst inactivating agent remain with the polymer and the catalyst. A number of catalyst inactivating agents can be employed such as hydroquinone, catechol, aniline, nitrobenzene and the like. Fatty acids can also be used, for example stearic acid as well as glycols, alkylgallates, furfural and the like. A preferred catalyst inactivating agent is rosin acid because of the beneficial effects this agent has in the finished polymer. Rosin acid, which is a disproportionated abietic acid, is commercially available. Since an excess of rosin acid can be used precise measurement of the catalyst which must be inactivated is not essential. For example, with triisobutylaluminum as the organometal component of the catalyst about 1 to 2 parts of rosin acid will quench 1 part by weight of triisobutylaluminum. Normally less than 1 part of triisobutylaluminum or similar compound per 100 parts by weight of polymer is present in the reaction effluent. Rosin acid can be added to inactivate this catalyst and provide a specification content of about 2 to 5 weight percent rosin acid in the finished product.

It is also desirable to add to the reaction effluent after it leaves the last reactor in the train any of the number of the well known rubber antioxidants such as N-isopropyl-N'-phenyl-p-phenylenediamine, N - phenyl-N'-cyclohexylp-phenylenediamine, and the like. After the polymerization effluent leaves the last reactor it generally passes to one or more surge tanks, not shown. When the polymerization effluent is withdrawn from the storage tanks, it is passed through a series of flashing zones which remove the unreacted monomer from the effluent and also a substantial amount of the diluent. The concentration of the polymer in the effluent increases as a result of these flashing steps from about 5 to 15 weight percent.

In the polymerization process which has been chosen to exemplify my invention, monomer, solvent and catalyst are fed continuously to a series of polymerization reactors. Ordinarily the total feed is passed to the first reactor, but monomer can be fed incrementally to one or more downstream reactors if desired. The effluent from the reactor train comprises polymer at a concentration of about 2 to 12 percent, unreacted monomer (ordinarily about 10 to 70 percent of that fed to the reactors), catalyst and solvent. It is desirable to inject additives into this effluent stream in order to inactivate the catalyst and inhibit oxidation of the polymer. The polymerization effluent is then heated and passed through a series of flashing steps with intermediate repressurizing and reheating so that substantially all of the unreacted monomer is vaporized together with enough solvent to increase the polymer concentration in the unvaporized residue to about 10 to 25 percent. The flash vapors form a return stream, a portion of which is recycled directly to the polymerization reactors while the remainder is purged to suitable repurification steps before being reused as fresh or make-up monomer and solvent.

*Examples*

In these examples, there will be described first the steady state operating conditions of the cis-1,4-polybutadiene polymerization process of FIGURE 1, after which there will be described the operation of the process wherein several disturbances occur at different periods of operation, which disturbances are detected and corrected according to this invention. 1,3-butadiene is polymerized in toluene with a catalyst comprising triisobutylaluminum, iodine, and titanium tetrachloride in a 8.0:1.5:1 mol ratio. In this continuous process, 9 reactors are used in series. Rosin acid and methylene-2,2'-bis(4-methyl-6-tert-butylphenol) are added to the reactor effluent as a catalyst shortstop and polymer antioxidant, respectively. The total residence time in the reactor train is 2 hours and the total conversion of butadiene to polybutadiene is 60.2 percent. Polybutadiene is produced at an over-all production rate of 7,240 pounds per hour and the injection of rosin acid is regulated to provide 2 parts by weight of rosin acid in 100 parts of finished polymer. The antioxidant is injected at a rate of 0.25 pound per 100 pounds of polymer.

Reactor temperatures are held at 25° F. in the first reactor, 30 to 39° F. in the second and third reactors, and 40° in the last six reactors. Reactor pressure is 65 p.s.i.a.

The reactor effluent is heated to 340° F. under a pressure of 370 p.s.i.a. and flashed to 16 p.s.i.a. the temperature falling to 227° F. The unvaporized residue is reheated to 340° F. at 280 p.s.i.a. and flashed again to 16 p.s.i.a., 235° F. Again the unvaporized residue is heated to 328° F. at 205 p.s.i.a. and flashed a third time to 16 p.s.i.a., 235° F. The overhead vapors are condensed by cooling to 100° F. at 15 p.s.i.a and the unvaporized polymer solution is withdrawn for polymer recovery. As a result of the three flashing steps, all unreacted butadiene is vaporized with sufficient toluene to increase the polymer concentration in the effluent from 4.6 to 15 percent.

The flow rate of fresh butadiene (including 2.5 weight percent butylenes) is 8,760 pounds per hour, the flow rate of fresh toluene is 68,900 pounds per hour, and the flow rate of recycle material is 79,340 pounds per hour. The sum of these flow rates, excluding the catalyst flow rates, is 157,000 pounds per hour, of which 12,020 pounds or 7.66 weight percent is butadiene. At a conversion of 60.2 weight percent, 7,240 pounds of butadiene are polymerized to cis-polybutadiene which leaves the flash zone as a 15 weight percent solution in 41,060 pounds per hour of toluene. Vapors are removed from the flash zone at a rate of 108,700 pounds per hour and are condensed, with 79,340 pounds per hour (containing 3,475 pounds of butadiene) being recycled as mentioned above, and the balance of 29,360 pounds per hour being withdrawn for repurification.

Catalyst component solutions are added at a minimum flow rate of 527 pounds per hour total. The flow rate of the solution containing titanium tetrachloride and iodine is 290 pounds per hour. The flow rate of the triisobutylaluminum solution is somewhat in excess of a minimum value of 237 pounds per hour (for example, 252 pounds per hour), and since this stream is the manipulated variable of the heat balance computer No. 1 and the set point of controller 146, its rate is changed from time to time to provide sufficient triisobutylaluminum to scavenge (inactivate) the catalyst poisons entering via the feed streams, in addition to providing a minimum flow rate of triisobutylaluminum for optimum formation of the active catalyst complex.

Under the steady state operating conditions previously described, wherein 7,240 pounds per hour of butadiene out of a total of 12,020 pounds per hour are being polymerized to cis-polybutadiene, 724 pounds per hour of polymer is being formed in reactor 11 of FIGURE 1 with the liberation of 434,400 B.t.u. per hour as determined by heat balance computer No. 1. Similarly, when reactor 12 is the fourth reactor of a series of nine reactors, heat balance computer No. 2 determines the heat liberated by reaction to be 304,000 B.t.u. per hour as the result of polymerization of 507 pounds per hour of butadiene to rubber polymer in this individual reactor.

While operating as described above, a sustained disturbance, such as an increase in catalyst poison concentration (for example, an increase from 5 to 8 parts per million of water in total feed stream 29), enters the process. The presently available triisobutylaluminum depletes by immediate reaction with this additional water so that a lessened amount of triisobutylaluminum is available to reduce the titanium to its most active valence level. If this disturbance were to go uncorrected, it would result in a decrease in reaction intensity, manifesting itself in reactor 11 as a decrease in heat generated by reaction from 434,400 to 360,000 B.t.u. per hour (a production rate decrease from 724 to 600 pounds per hour). However, as reaction intensity declines, heat balance computer No. 1, continuously computing this heat quantity, sends this declining signal to controller 146, which, also in a continuous fashion, increases its output signal which, passing through relay 148, raises the set point of the triisobutylaluminum flow controller 23, increasing the opening of valve 24 until rotameter 21 signals the increased flow of triisobutylaluminum. The increased flow of triisobutylaluminum replenishes the lessened catalytically-available amount, restoring catalyst activity which in turn increases the reaction intensity, heat generated and consequent production rate. Characteristic dampened-oscillatory behavior of this closed-loop reacting, computing and controlling system takes place. After a short stabilizing period of time, the production rate signal from computer No. 1 again equals the set point of controller 146 and all process measurements regain their previous steady-state conditions with the exception of the flow rate of triisobutylaluminum which stabilizes at the slightly higher level (for example, 260 pounds per hour flow rate) necessary to react with catalyst poisons and still activate the titanium.

Similarly, a step-type decrease in poison concentration from 5 to 3 parts per million of water causes a final net change in triisobutylaluminum flow rate from 252 to 243 pounds per hour after the process control system's transient response dampens out, the production rate regaining its previous value of 724 pounds per hour.

In one period of operation, these last-mentioned transient disturbances, corrected as described above in reactors 12 and 13. In another period of operation of) downstream reactors 12 and 13. In another period of operation, these disturbances, however, even though satisfactorily corrected as far as production rate in reactor 11 is concerned, do affect reaction intensity in reactors 12 and 13. In another period of operation, disturbances in PR in reactor 12 occur, which do not manifest themselves at all in reactor 11, but are detected and corrected in the downstream reactors 12 and 13.

Disturbances in certain poisons concentration and total train feed rate entering reactor 11 cause transient behavior which is corrected as previously described, but for these reasons or for reasons associated only with reactor 12, a decrease in reaction intensity in reactor 12 (for example, a decline in production rate from 507 to 490 pounds per hour of polymer) is encountered. This decline is transduced continuously by heat balance computer No. 2, which, in the mode of operation whereby the output of computer No. 2 is sent directly to controller 152, causes an adjustment of the set points of temperature controllers 50' and 50" upward to counteract this production rate decline. Thus, the PR of reactor 12 itself is corrected by a final net change in reactor temperature, from 40 to 42° F. for example, and in addition, this change is applied to all of the reactors further downstream as a first approximation to the true future situation, which is based on the extrapolation of the behavior of reactor 12.

Thus, the process control method for reactor 12 is of the feedback nature, but that of reactor 13 is of the predictive or anticipatory nature, since control action may be applied to reactor 13 in advance of its receiving the disturbance via the process route. If desired, signal lag network 154 is introduced into the set point control signal to controller 50" (only) to modify the control dynamic situation as desired.

In the mode of operation whereby the PR signal from computer No. 1 passes through lag network 155 and combines with the PR signal from computer No. 2 in adder 151 before being employed as the measurement input to controller 152, two control purposes are served. The first is to further dampen out the PR oscillatory behavior in the reacting material by anticipatory control of reactors 12 and 13 since the oscillatory behavior generated in reactor 11 by the transient disturbances in poisons concentration cannot be completely nullified by a simple feedback control system in reactor 11 and does propagate to a limited extent down the reactor train. The second purpose is as given previously in regard to the utility of the computer No. 2 and controller 152 system in correcting disturbances which propagate to the downstream reactors even though corrected as far as reactor 11 is concerned.

Under steady state operating conditions the total of the two production rates from adder 151 is 1231 pounds per hour. A change in PR from computer No. 1 is delayed by lag 155 to the same or a slightly lesser extent than the process material is delayed by the intervening reactors. The PR from computer No. 2 is not delayed since its purpose is feedback control as previously described. A decline in the total PR, due to a decline in one or both of the individual PR's, to 1200 pounds per hour is corrected by a final net change in the temperatures of reactors 12 and 13 from 40 to 42° F.

Various modifications and alterations of this invention will become apparent to those skilled in the art without departing from the scope and spirit of this invention, and it should be understood that the foregoing discussion should not be construed to limit unduly the subject invention.

I claim:
1. A method of controlling the production rate of reaction product produced in a plurality of reactors operated in series in a contiuous exothermic process wherein a chemical reaction is carried out and exothermic reaction heat is removed by partial vaporization of a liquid volatile coolant passed in direct heat exchange with the contents of said reactors, said method comprising the steps of measuring the sensible heat removed by the reactant feed stream supplied to a first reactor and producing a signal $Q_1$ proportional thereto; measuring the heat removed from said first reactor by said coolant supplied to said first reactor and in thermal contact with said first reactor and producing a signal $Q_2$ proportional thereto; measuring the accumulation of heat in said first reactor resulting from the changes in the temperature in said first reactor and producing a signal $Q_3$ proportional thereto; measuring the heat supplied to said first reactor by agitation of the reaction mixture therein and producing a signal $Q_4$ proportional thereto; measuring the heat transferred to said one reactor by the surroundings and producing a signal $Q_5$ proportional thereto; producing a signal $K_1$ proportional to the heat of reaction for said chemical reacting; combining said signals according to the equation:

$$PR_1 \frac{Q_1+Q_2+Q_3-Q_4-Q_5}{K_1}$$

producing a signal $PR_1$ which is representative of the production rate of product produced in said first reactor; producing a signal $PR_2$ which is representative of the production rate of product produced in an intermediate reactor in said plurality of reactors; combining the $PR_1$ signal with the $PR_2$ signal; producing a $PR_t$ signal in direct response to the sum of said $PR_1$ and $PR_2$ signals; controlling the vaporization conditions of said coolant passed in indirect heat exchange with the contents of each of said plurality of reactors downstream from said first reactor in response to this $PR_2$ signal in order to maintain a predetermined production rate of reaction product for all of said reactors downstream of said first reactor and controlling the flow rate of a catalyst component entering the first reactor, in response to a predetermined $PR_1$ signal in order to maintain a predetermined production rate of reaction product in said first reactor.

2. The method according to claim 1 wherein said process is a catalytic polymerization process for the production of cis-1,4-polybutadiene, and said reactant feed stream comprises 1,3-butadiene in a toluene solvent stream carrying a catalyst complex formed by admixture of triisobutylaluminum, titanium tetrachloride, and iodine.

3. A method according to claim 2 wherein the flow rate of said triisobutylaluminum catalyst component supplied to said first reactor is controlled in response to a predetermined $PR_1$ signal to maintain a predetermined production rate of a reaction product in said first reactor.

4. In a plant for carrying on a continuous exothermic process including a plurality of reactors operated in series wherein a chemical reaction is carried out, each of said reactors being provided with conduit means to supply feed means thereto, with conduit means for withdrawal of reaction mixture, with agitation means to agitate the reaction mixture within the reactors, with cooling means, and with conduit means associated with each of the reactors for passing a coolant therethrough from the cooling means, the pressure at which said coolant is vaporized in said cooling means determining the temperature in each of said reactors, in combination with an improved control system for controlling the production rate of reaction product produced in said plurality of reactors, said system comprising measuring means to measure the sensible heat removed by the reactant feed supplied to the first reactor in said series of reactors and to produce a signal $Q_1$ proportional there; measuring means to measure the heat removed from said first reactor by said coolant and to produce a signal $Q_2$ proportional thereto; measuring means to measure the accumulation of heat in said first reactor resulting in changes in the temperature in said first reactor and to produce a signal $Q_3$ proportional thereto; measuring means to measure the heat supplied to said first reactor by said agitation and to produce a signal $Q_4$ proportional thereto; measuring means to measure the heat transferred to said first reactor by the environmental surroundings and to produce a signal $Q_5$ proportional thereto; means to produce a signal $K_1$ proportional to the heat of reaction for said chemical reaction; means for combining said signals according to the equation:

$$PR_1 = \frac{Q_1 + Q_2 + Q_3 - Q_4 - Q_5}{K_1}$$

means to produce a signal $PR_1$ proportional to the production rate of reaction product produced in said first reactor of said series of reactors; means to produce a signal $PR_2$ proportional to the production rate of reaction product produced in an intermediate reactor of said series of reactors; means for combining the $PR_1$ signal with the $PR_2$ signal; means for producing a $PR_t$ signal in direct response to the sum of said $PR_1$ and said $PR_2$ signals; means for controlling the vaporization conditions of said coolant flowing in said cooling means in direct heat exchange with the contents of each of said plurality of reactors downstream from said first reactor in response to a predetermined $PR_t$ signal in order to maintain a predetermined production rate of reaction product produced in all of said reactors downstream of said first reactor; means for controlling the flow rate of a catalyst component entering the first reactor in response to a predetermined $PR_1$ signal to maintain a predetermined production rate of reaction product produced in said first reactor.

References Cited by the Examiner
UNITED STATES PATENTS

| | | | |
|---|---|---|---|
| 2,908,734 | 10/1959 | Cottle | 260—94.9 |
| 2,974,017 | 3/1961 | Morgan | 260—94.9 |
| 3,000,812 | 9/1961 | Boyd | 196—132 |
| 3,074,919 | 1/1963 | Mellow | 260—94.9 |
| 3,074,922 | 1/1963 | Dye | 260—94.9 |
| 3,076,795 | 2/1963 | Hall | 260—94.7 |
| 3,078,265 | 2/1963 | Berger | 260—24.9 |
| 3,099,648 | 7/1963 | Dye | 260—94.3 |

JOSEPH L. SCHOFER, *Primary Examiner.*

M. LIEBMAN, *Examiner.*